(12) United States Patent
Seraphim et al.

(10) Patent No.: US 6,459,462 B1
(45) Date of Patent: Oct. 1, 2002

(54) PROCESS AND TOOL FOR MAINTAINING THREE-DIMENSIONAL TOLERANCES FOR MANUFACTURING TILED AMLCD DISPLAYS

(75) Inventors: Donald P. Seraphim, Vestal, NY (US); Dean Skinner, Vestal, NY (US); Ho Chong Lee, Endicott, NY (US); Kevin G. McKenna, Summitt, PA (US); Christopher D. Turock, Endicott, NY (US)

(73) Assignee: Rainbow Displays, Inc., Endicott, NY (US)

( * ) Notice: Subject to any disclaimer, the term of this patent is extended or adjusted under 35 U.S.C. 154(b) by 0 days.

(21) Appl. No.: 10/056,187

(22) Filed: Jan. 28, 2002

(51) Int. Cl.[7] .............................. G02F 1/13; G02F 1/133
(52) U.S. Cl. .......................... 349/73; 349/187; 445/24; 156/560; 156/298
(58) Field of Search .......................... 349/187; 454/24; 156/297, 298, 299, 300, 560, 561, 562; 345/11, 3

(56) References Cited

U.S. PATENT DOCUMENTS

| | | | |
|---|---|---|---|
| 5,407,519 A | * | 4/1995 | Joffe et al. .................. 156/358 |
| 5,661,531 A | | 8/1997 | Greene et al. |
| 5,668,569 A | | 9/1997 | Greene et al. |
| 6,020,868 A | | 2/2000 | Greene et al. |
| 6,097,455 A | | 8/2000 | Babuka et al. |
| 6,115,092 A | | 9/2000 | Greene et al. |
| 6,129,804 A | * | 10/2000 | Gaynes et al. ............... 156/297 |
| 6,133,969 A | | 10/2000 | Babuka et al. |
| 6,181,392 B1 | | 1/2001 | Greene et al. |
| 6,184,952 B1 | | 2/2001 | Greene et al. |
| 6,184,953 B1 | | 2/2001 | Greene et al. |
| 6,188,454 B1 | | 2/2001 | Greene et al. |
| 6,243,059 B1 | | 6/2001 | Greene et al. |
| 6,271,825 B1 | | 8/2001 | Greene et al. |

* cited by examiner

Primary Examiner—Kenneth Parker
(74) Attorney, Agent, or Firm—Salzman & Levy

(57) ABSTRACT

There is provided an improved method for laminating the components of a tiled display such as an AMLCD tiled display. In conventional laminating processes, forces are applied to the two parallel glass plates (i.e., the cover and back plates) separated by a liquid adhesive film. The two plates are squeezed together over their entire area forcing liquid laterally out from between the glass plates and tiles until the desired spacing or gap (filled with liquid adhesive) between the cover and back plates and the tiles is obtained. However, this process may require several hours to complete for large panels and, in addition the process is susceptible to trapping air bubbles in the adhesive. Consequently, the traditional process is not well suited for the mass production of large panels. The "pseudo" rolling-like lamination process of the present invention replaces the traditional lamination process and requires significantly less time.

22 Claims, 14 Drawing Sheets

Table 1

Velocity = 1 in/sec., Viscosity = 0.00058 LB-sec/1.2m. or sq. in. (4000 C.P.), L=0.37

| $h_o$ \ $\Delta h$ | .50 | 1.00 | 1.50 | 2.00 | 2.50 | 3.00 | 3.50 | 4.00 | 4.50 | 5.00 |
|---|---|---|---|---|---|---|---|---|---|---|
| .50 | 100.93 | 93.96 | 78.89 | 65.77 | 55.37 | 47.21 | 40.75 | 35.57 | 31.35 | 27.87 |
| 1.00 | 20.83 | 25.23 | 25.05 | 23.49 | 21.60 | 19.72 | 17.99 | 16.44 | 15.06 | 13.84 |
| 1.50 | 7.50 | 10.31 | 11.21 | 11.27 | 10.94 | 10.44 | 9.88 | 9.32 | 8.77 | 8.25 |
| 2.00 | 3.51 | 5.21 | 6.00 | 6.31 | 6.36 | 6.26 | 6.09 | 5.87 | 5.64 | 5.40 |
| 2.50 | 1.92 | 2.99 | 3.58 | 3.9 | 4.04 | 4.07 | 4.04 | 3.97 | 3.87 | 3.76 |
| 3.00 | 1.16 | 1.87 | 2.31 | 2.58 | 2.73 | 2.8 | 2.83 | 2.82 | 2.78 | 2.73 |
| 3.50 | .75 | 1.25 | 1.58 | 1.80 | 1.93 | 2.02 | 2.06 | 2.08 | 2.07 | 2.06 |
| 4.00 | .52 | .88 | 1.13 | 1.30 | 1.42 | 1.50 | 1.55 | 1.58 | 1.59 | 1.59 |
| 4.50 | .37 | .64 | .83 | .97 | 1.07 | 1.15 | 1.20 | 1.23 | 1.25 | 1.26 |
| 5.00 | .27 | .48 | .63 | .75 | .83 | .90 | .94 | .97 | 1.00 | 1.01 |

Loads $W_1$ For Example Shown in Figure 4

*Figure 5a*

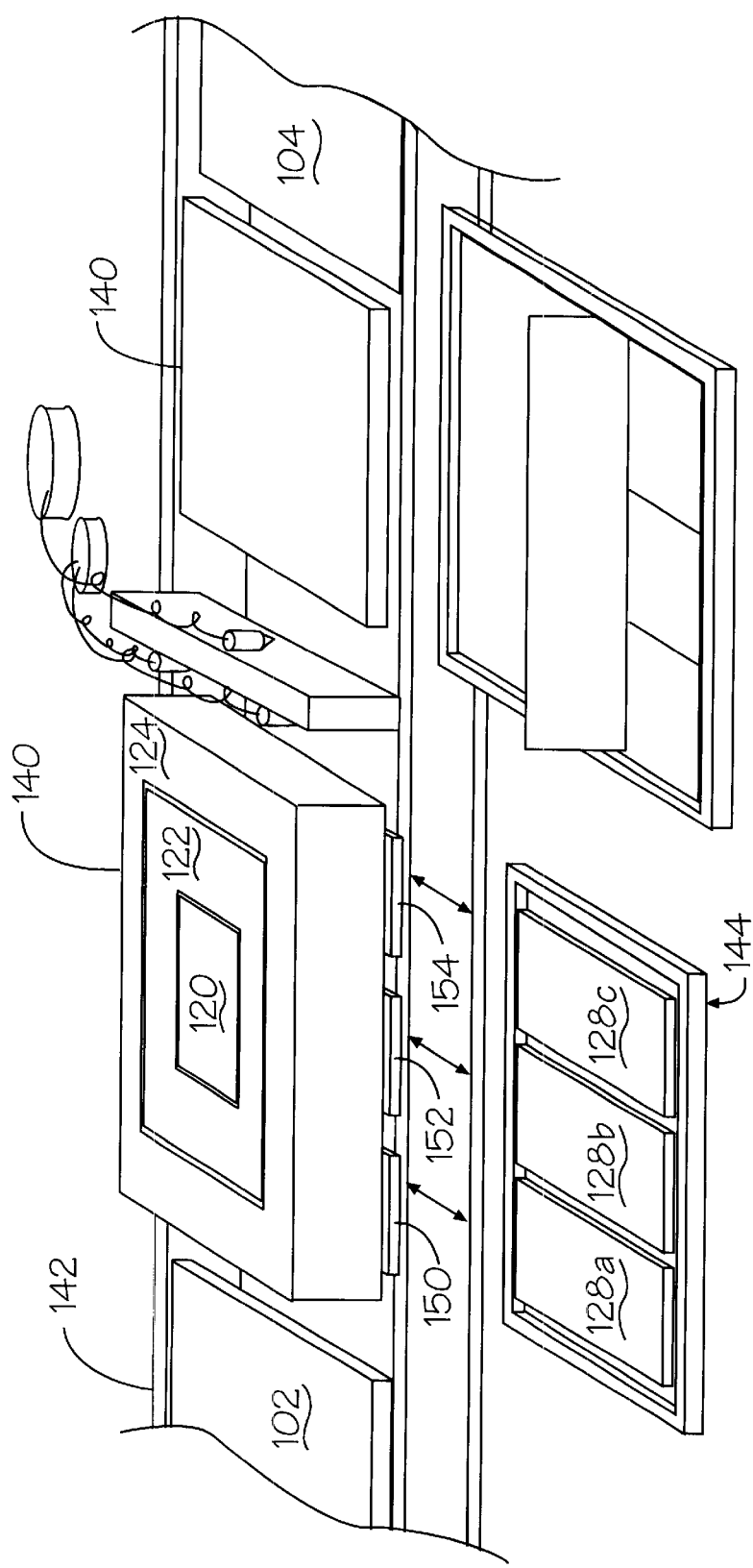

PROCESS AND TOOL FOR MAINTAINING THREE-DIMENSIONAL TOLERANCES FOR MANUFACTURING TILED AMLCD DISPLAYS

RELATED APPLICATION

The present patent application is related to U.S. Pat. No. 5,661,531 for TILED, FLAT-PANEL DISPLAY HAVING INVISIBLE SEAMS; U.S. Pat. No. 6,133,969 for MAINTAINING THREE-DIMENSIONAL TOLERANCES WHILE MANUFACTURING AMLCD DISPLAYS; and U.S. Pat. No. 6,097,455 for FLAT PANEL DISPLAYS HAVING TILES AND VISUALLY IMPERCEPTIBLE SEAMS THEREBETWEEN. All of the above-identified patents are assigned to the common assignee of the instant application and are hereby incorporated by reference.

FIELD OF THE INVENTION

This invention pertains to the manufacture of flat-panel electronic displays and, more particularly, to the manufacture of AMLCD type, flat-panel displays assembled from arrays of tiles, while maintaining tolerances in three dimensions.

BACKGROUND OF THE INVENTION

Images on electronic displays are derived from an array of small, picture elements known as pixels. In color displays, these pixels comprise three color elements that produce the primary colors, for example, red, blue and green (R, B and G). Usually arranged in rectangular arrays, these pixels can be characterized by a pixel pitch, P, a quantity that measures the spacing of pixels in one direction. A typical cathode ray tube (CRT) display used for computer applications has a pixel pitch of 0.3 mm. Computer monitor screens typically have a pixel array width:height ratio of 4:3. Consumer television displays now often have a ratio of 16:9. Typical, standardized arrays in computer displays are composed of 640×480 (VGA), 800×600 pixels (SVGA), 848×480 (wide VGA), 1024×768 pixels (XGA), or 1280×720 (HDTV).

Large displays can be constructed from a plurality of adjacent tiles, each having a single pixel or an array thereof. Such assembled tiled displays contain visually disturbing seams, resulting from the gaps between adjacent pixels on adjacent tiles. Such seams may incorporate interconnect, adhesives, seals, mechanical alignment means and other components resulting in optically visible discontinuities in displayed images. Some of these structures are described in the aforementioned U.S. Pat. No. 5,661,531. As a consequence, the image portrayed on seamed displays appears segmented and disjointed. Therefore, it is desirable to fabricate tiled, flat-panel displays which do not have noticeable or perceptible seams under the intended viewing conditions.

The pixel pitch in electronic displays must be set so that a continuous image is produced when the display is viewed at distances greater than the minimum viewing distance. For example, with a pixel pitch of P=0.3 mm, the minimum viewing distance is on the order of 1 m. Even though the minimum viewing distance increases in proportion to the pixel pitch, this distance still limits the pixel pitch for most computer and consumer displays. Since space for the tiling functions must be provided in spaces smaller in size compared to the pixel pitch, it is difficult to develop structures and methods for constructing tiled displays.

Flat-panel displays (FPDs) provide the best choice for constructing "seamless", tiled screens. Flat-panel displays include back lighted and self-lighted displays. Liquid crystal displays (LCDs) are the most common back lighted displays. Flat-panel displays depend on the micro fabrication of key components that carry the pixel patterns. Such micro fabrication techniques, however, are not viable for very large displays, generally greater than 20 inches diagonal, due to the fact that the manufacturing yield declines rapidly with increasing area of the display. Therefore, the inventors have determined that tiles with arrays of pixels can be micro fabricated and then assembled together to form a larger electronic display.

The present invention provides unique designs and methods for achieving such large monolithic or monolithic-like seamless, tiled panels for color or gray-scale displays. This invention particularly focuses on displays of the transparent, light valve type. In such displays, light from a uniform, back light source is transmitted through the display assembly and directly viewed from the front side of the display. The light valves control the amount of primary light rays transmitted through each of the color elements in the pixels. The viewer's eyes merge the primary light from the pixels to form a continuous image at a sufficient viewing distance.

A large FPD made by tiling smaller LCD panels may exhibit visual seams at the boundary of the two adjacent tiles. Light will primarily flow through the seams or gaps between tiles. The design of the tiled FPD structures must substantially eliminate this light emanating from the seams. This is accomplished by using masks within the assembled structure but external to the individual tiles. These masks are effective in preventing light within a preferred (i.e., designed) angular range from reaching the seams. The incident light at or near the seams is collimated to within this preferred angle. The mask lines, which are placed in the dark spaces between pixels repeat, at every pixel.

However, because of a number of secondary processes, low-level light emanates from regions near the seam because of other mechanisms. The optical mechanisms which include reflection and light guiding must be controlled to ensure emanated light near the seams is kept to a minimum in order to achieve sufficient brightness and contrast. At the edges of adjacent tiles, the spaces between pixels on the same tile and the spaces between edge pixels on adjacent tiles may have different structures. Consequently, the presence of seams between the pixels at the edge of the tiles will affect both primary and secondary light rays, thus making the construction of seamless, tiled displays more difficult. The masks are only partially effective in eliminating these optical artifacts at the seams of the tiled, flat-panel displays.

The residual visible artifacts remaining at the seams require both light intensity and color-correction of the pixels neighboring the seams, and balance of color and light intensity from tile to tile. These corrective actions may be achieved by several approaches utilizing control and driving electronics and software. Some techniques for performing these corrections are disclosed in U.S. Pat. Nos. 5,668,569; 6,020,868; 6,115,092; 6,181,392; 6,184,952; 6,184,953; 6,188,454; 6,243,059; and 6,271,825, all of which are commonly assigned to the assignee of the present invention.

In addition to the optical and electronic correction means, the inventors have identified three design principles in assembling large-size, seamless, flat-panel displays that may be viewed as though they were single monolithic displays:

a) the pixel pitch on the view plane for the tiles must be matched to that of the pixel pitch on the view plane between the tiles within a predetermined critical set of tolerances;

b) the primary light paths through the light valves must not be substantially affected by the presence of the seam or any other structures or components used in the tile assembly; and c) the interpixel gaps must be designed so that intratile and intertile pixel gaps, which have different physical structures, present approximately the same visual appearance to the viewer under both transmitted and reflected light.

This has largely been accomplished by applying the technology disclosed in U.S. Pat. No. 5,661,531 to fabricated, tiled AMLCD functional models. In addition, U.S. Pat. Nos. 6,133,969 and 6,097,455 feature methods for assembling arrays of AMLCD tiles into tiled, flat-panel displays having visually imperceptible seams between the tiles. However, design improvements are possible to increase the manufacturing yield and the optical performance of the tiled displays from their component tile parts. The present invention focuses on preferred processes for assembling the tiles into robust laminates between glass cover plates and back plates. The instant invention also provides tooling elements for implementing these processes and facilitating high throughput assembly of AMLCD tiles into FPDs.

Tiled FPDs require a high degree of location precision and alignment in all three orthogonal dimensions, X, Y, and Z, to appear monolithically, optically continuous, pixel-to-pixel, across seams between neighboring tiles. The means to achieve AMLCD tiled FPDs in this invention require referencing the tiles along the Z dimension with optically clear adhesive films of a preferred thickness. This thickness must accommodate both intratile and tile-to-tile thickness variations without unduly affecting either primary or secondary light rays in the seam regions.

The tiles are spaced by the-films between continuous, flat, optically clear cover and back plates preferably containing masks, and having closely matched indices of refraction. At the same time, the horizontal (x) and vertical (y) dimensions of the FPD tiles are maintained, locating the pixels across the seams with continuity in pitch and parallelism. This is accomplished through the use of unique tools and by the use of a carefully controlled process of applying polymer adhesive materials to encapsulate the tiles between cover and back plates.

An important part of the process is maintaining location of the tiles and cover and back plates to each other while they are being handled and transferred during the assembly operations. This is achieved by applying small polymer adhesive dots (typically acrylic), which may be cured with UV light. These polymer adhesive dots are located in the perimeter, outside the active viewing area of the FPD, prior to applying the full face adhesive films.

The full face adhesive films, either liquid or solid, or a combination thereof, are typically in the range of approximately 50 to 500 microns in thickness, and are preferably in the range of approximately 50–150 microns. The films are also optimized in viscosity for rapid lamination of the tiles to cover and back plates. The adhesive is thermally cured.

After the lamination process is completed to reach the desired thickness of the adhesive and the precision location of the glass plates, the polymer dots are cured with UV light to maintain the relative locations of the tiles and cover and back plates. The assemblies are then sufficiently robust for transfer operations in the process sequence.

The full face adhesive polymer is generally cured in an oven. The fully cured polymer is sufficiently compliant over the full face surfaces of the tiles so as not to stress the tiles or alter the cell gap of the liquid crystal display tiles or display panels.

SUMMARY OF THE INVENTION

The present invention provides an improved method for laminating the components of an AMLCD tiled display. In conventional laminating, forces are applied to the two parallel glass plates (i.e., the cover and back plates) separated by a liquid adhesive film. The two plates are squeezed together over their entire area forcing liquid laterally out from between the glass plates and tiles until the desired spacing or gap (filled with liquid adhesive) between the cover and back plates and the tiles is obtained. However, this process may require several hours to complete for large panels and, in addition the process is susceptible to trapping air bubbles in the adhesive. Consequently, the traditional process is not well suited for the mass production of large panels. The "pseudo" rolling-like lamination process of the present invention replaces the traditional lamination process and requires significantly less time.

It is therefore an object of the invention to provide a novel lamination process for assembling AMLCD tiles suitable for use in constructing large, tiled flat-panel displays.

It is another object of the invention to provide a lamination process in which a thin cover plate and a thin, flexible back plate are bent at a predetermined radius of curvature, and an initial single point of contact with full face adhesive is progressively increased in area, as the contact front is moved across the plates.

It is a further object of the invention to provide a tool and lamination process for bending the cover and back plates at a predetermined radius of curvature and for producing an initial single line of contact with the adhesive so that pure rolling action ensues between the cover and back plates and the full face adhesive thereby increasing the area of contact of the full face adhesive material until the lamination is completed.

It is yet another object of the invention to provide a process in which the adhesive contact area can be driven by force by bending the glass cover and back plates sequentially in a manner to produce a rolling action.

It is also an object of the invention to provide a process wherein the adhesive contact area can be driven by force by bending the glass cover and back plate glass sequentially in a manner to produce a rolling action.

It is a still further object of the invention to produce a center-out rolling adhesive contact front lamination through a sequential annular set of vacuum chucks that can be independently moved.

It is another object of the invention to provide means to pre-align a set of display tiles to dimensions that permit automatic capture of a fiducial image on the tiles and cover and back plates.

It is a further object of the invention to provide means for dispensing the adhesives and mixing the components of the thermally curable full face adhesive.

It is still a further object of the invention to provide means to protect electronic drivers attached to the display tiles from contamination by excess adhesive.

It is also an object of the invention to provide guttering means to collect and remove excess adhesive squeezed out during the lamination process.

It is a further object of the invention to dispense adhesive in a predetermined volume over a predetermined area on an array of display tiles or on cover plates or back plates.

It is another object of the invention to optimize the lamination speed.

It is again an object of the invention to control the final thickness of adhesive between display tiles and cover and/or back plates.

It is also an object of the invention to prepare the surfaces of display tiles, cover and back plates to wet readily with adhesive to decrease the probability of trapping or forming bubbles in the adhesive.

It is a still further object of the invention to provide an adhesive having a viscosity for lamination under preferred conditions for achieving an optimal speed of lamination without trapping or including bubbles in the adhesive.

It is yet another object of the invention to provide an adhesive material and process which responds to the preferred laminate design without adversely impacting the liquid crystal cell gap.

It is also an objective of the invention to provide adhesive posts to facilitate registration of display tiles and cover and back plates that are sufficiently viscous and rigid, so that the liquid adhesive flows around the posts during lamination without destroying their ability to sustain permanent registration after curing by UV radiation.

It is a still further objective of the invention to provide pressure during the curing of the adhesive to prevent or depress bubble which would otherwise precipitate from the adhesive during the heat up cycle.

BRIEF DESCRIPTION OF THE DRAWINGS

A complete understanding of the present invention may be obtained by reference to the accompanying drawings, when used in conjunction with the subsequent detailed description in which:

FIG. 5a is a table of results of equations applied to a wedge model;

FIG. 8 is a pictorial view of the positions of an assembled FPD within the shuttle system, and the positions of the components being worked on simultaneously in the inventive manufacturing machine;

DETAILED DESCRIPTION OF THE PREFERRED EMBODIMENT

Figure 1:
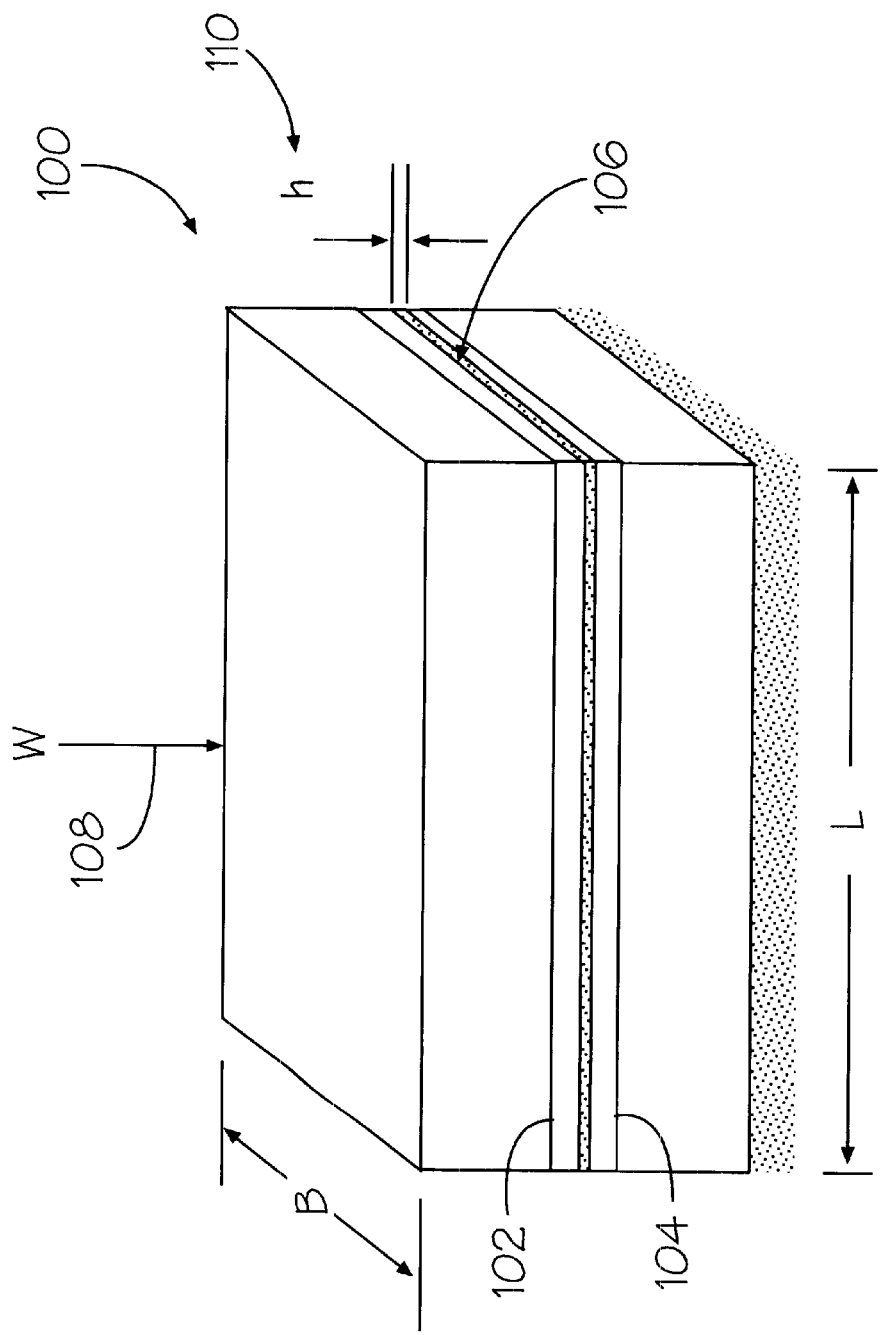
FIG. 1 is a perspective, cross sectional view of two glass sheets separated by a liquid adhesive representing a cover plate being adhesively bonded to an AMLCD tile.

Referring first to FIG. 1, there is shown a schematic, perspective sectional view of two thin plates having a thin adhesive film between the plates, generally at reference number 100. The lamination process as applied to a pair of thin plates 102, 104 with a liquid adhesive layer 106 between the plates may be approximately mathematically modeled using methods of classical mechanics, so that the key variables in the process may be understood. Similarities in the modeling between lamination processes and hydrodynamic lubrication. deduced by the inventors showed that models previously generated for squeeze film dynamics could be applied to lamination processes. These models allow an understanding of the relationship among the lamination load 108, liquid adhesive film thickness 110 and time.

When two large glass panels 102, 104 are laminated with a liquid adhesive 106, the process includes an assembly step which must not only squeeze out the air bubbles from between the two plates 102, 104, but must also obtain the desired adhesive film thickness 110. The required squeeze time is a function of the initial film thickness, liquid adhesive viscosity, the panel size (e.g., dimensions "B" and "L"), and the applied load 108.

The relationships among the above mentioned parameters can be obtained utilizing the solution known in lubrication theory; more specifically, the squeeze film model. When two parallel surfaces 102, 104 separated by a viscous film 106 move towards one another (FIG. 1), the pressure distribution in the film is described by the following differential equation (a reduced form of Reynold's equation) which is integrated to obtain the required external load W:

$$\frac{\partial^2 p}{\partial x^2} + \frac{\partial^2 p}{\partial y^2} = \frac{12\mu}{h^3}\frac{dh}{dt} \quad (1)$$

$$W = \int_A p\, dA \quad (2)$$

where:

P is the pressure in the film;

$\mu$ is the viscosity;

h is the film thickness;

A the surface area (B×L);

W the external load 108; and (x, y, T) are the space and time coordinates.

The final solution is obtained in an infinite series form, and can be reduced to the following form:

$$\Delta T = \alpha\left(\frac{B}{L}\right)\frac{\mu B^2}{W/A}\left[\frac{1}{h^2} - \frac{1}{h^2{}_o}\right] \quad (3)$$

where:
B is the surface width; and
B/L is the width/length ratio.

The time $\Delta T$ is the squeeze time between the initial thickness, $h_o$, and final thickness, h.

The factor $\alpha(B/L)$ is the infinite series sum which solely depends upon the ratio, B/L. ("Theory of Hydrodynamic lubrication," by Pinkus and Sternlicht, McGraw Hill Book Company, 1961.)

Figure 2:
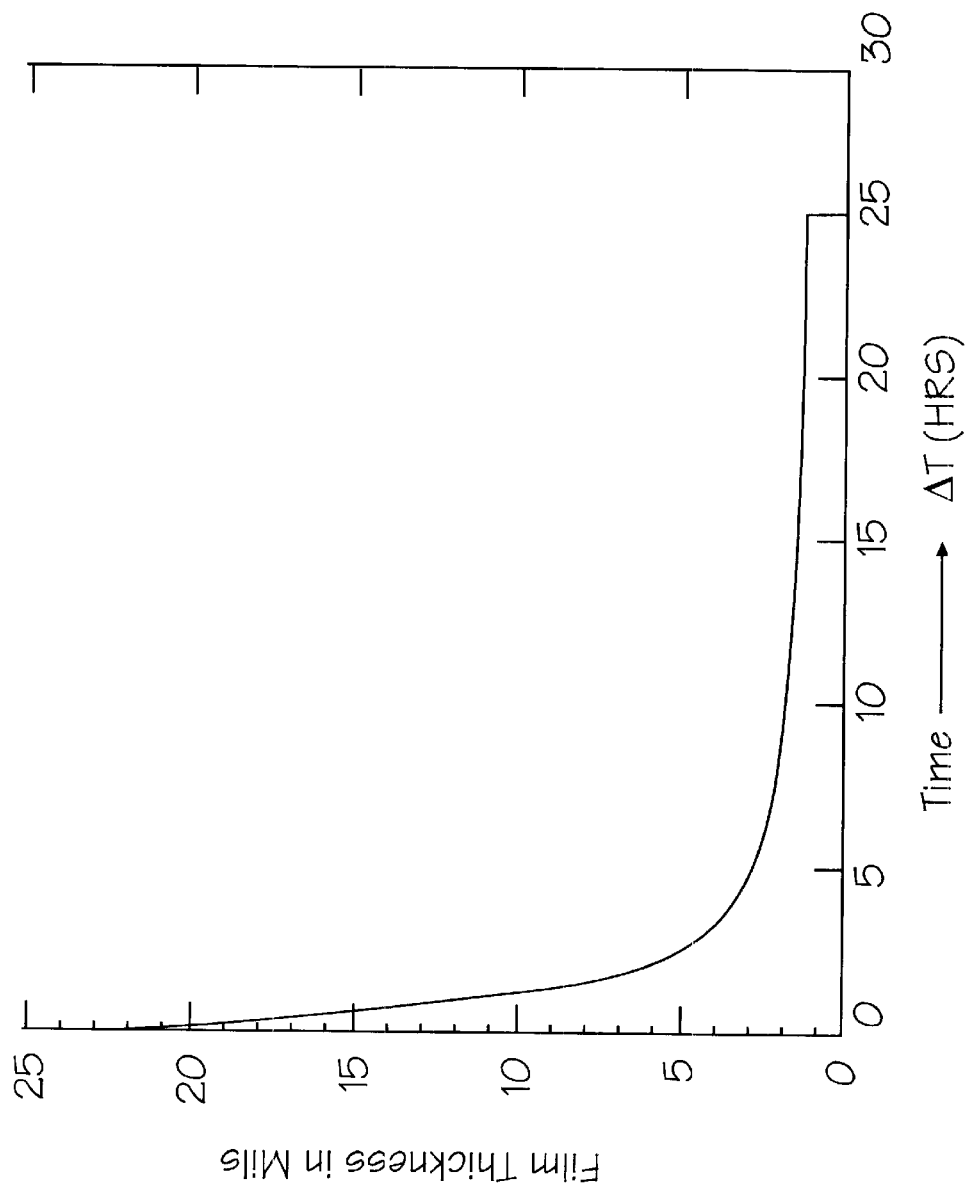
FIG. 2 is a plot of the time required when two glass sheets with adhesive between them are pressed together over a large area typical of tiled AMLCDs.

A curve of film thickness as a function of time is shown in FIG. 2 for a solution of Equation (3), where the ratio B:L=9:16. This 9:16 ratio is typical in a large, flat-panel display. In addition, typical processing parameters including initial film thickness, adhesive viscosity and load have been supplied. These parameters are discussed in detail hereinbelow. As may be observed from the curve of FIG. 2, as film thickness decreases, the required processing (i.e., squeeze) time increases. Similar solutions for other panel sizes and/or adhesive parameters, of course, may be obtained from Equation (3).

The time required for the lamination process to achieve preferred adhesive filled gap thickness, typically in the range of 100"50 microns, between the panels, approximately 5 hours, using an applied pressure of approximately 0.25 psi, with the chosen adhesive parameters, and panel sizes. Results from modeling substantiates this time. Unfortunately, this is an unacceptably long time for a manufacturing process. Accordingly, quicker lamination processes using newly developed tools and assembly sequences are provided by the present invention. Both the theory and mechanical calculations suggest that a manufacturing (i.e., lamination) process requiring only a few minutes may be achieved.

Figure 3:
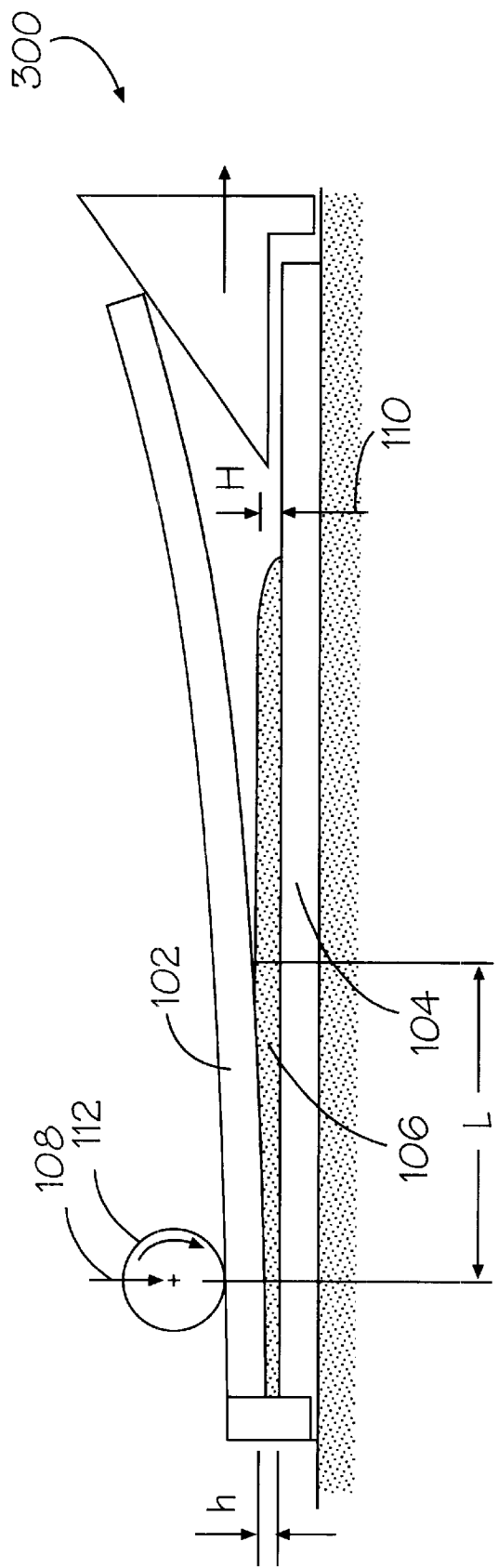
FIG. 3 is a cross sectional view showing a cover plate being laminated to an AMLCD tile with liquid adhesive by a roll mechanism in which the cover plate is bent under the roller.

Referring now to FIG. 3, there is shown a schematic, cross sectional view 300 of the roll-on like lamination process of the present invention being used with a liquid adhesive. With infinitely long rolls 112, the pressure, p(x) in the adhesive film 106 under a rolling load 108 may be expressed by one-dimensional Reynold's equation:

$$\frac{d}{dx}[h^3(x)]\frac{dp}{dx} = 12\mu\frac{dh}{dt} \quad (4)$$

$$p(0)=p(L)=0$$
$$W = \int_0^L p\,dx \quad (5)$$

Figure 4:
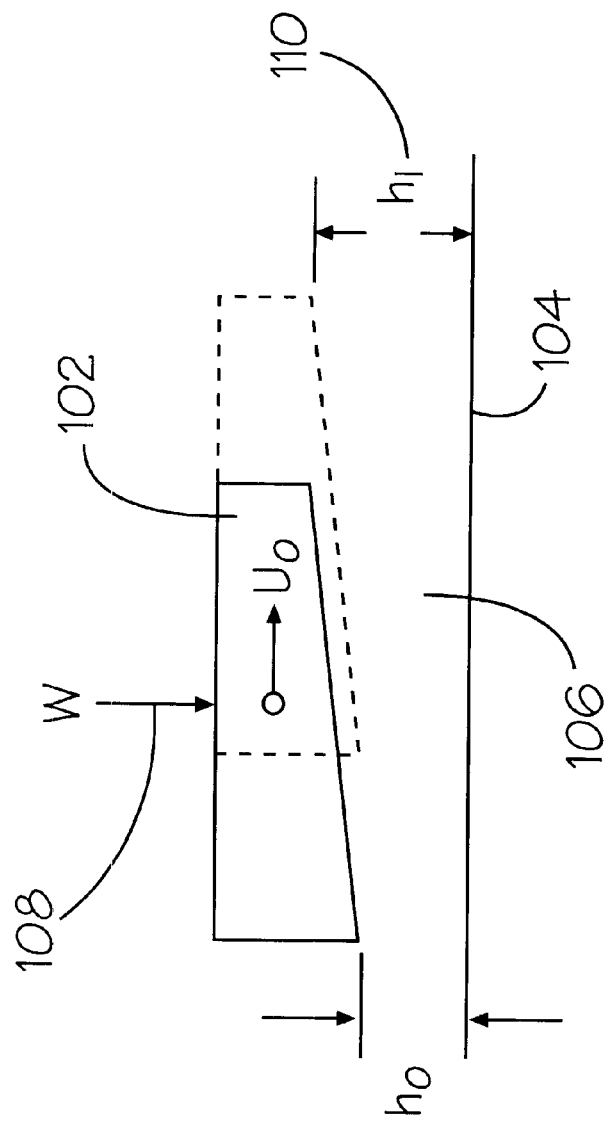
FIG. 4 is a simplified mechanical analytical model of the roll process of FIG. 3 represented by a wedge of adhesive between two flat plates.

Referring now also to FIG. 4, the film thickness 106, h(x), may be assumed as a wedge profile formed by two flat plates 102, 104 or by a flat plate and a cylinder (not shown).

For the straight wedge:

$$h(x) = ho + \frac{h_1 - h_2}{ho}x = ho + ax \quad (6)$$

therefor, $$\frac{dh}{dt} = a\frac{dx}{dt} = aU = \text{constant} \quad (7)$$

Where U is the roller velocity.

Equation (4) may be readily integrated and the relationship, W, and the lamination speed, U are obtained:

$$\frac{W_1}{12\mu U} = \frac{L^2}{\Delta h^2}K_1\left(\frac{\Delta h}{h_0}\right) \quad (8a)$$

where:
$\Delta h = h_1 - h_0$ $$K_1\left(\frac{\Delta h}{h_0}\right) = \frac{\frac{2\Delta h}{h_0}}{2 + \frac{\Delta h}{h_0}} - \ln\left(1 + \frac{\Delta h}{h_0}\right) \quad (8b)$$

where:
$\Delta h = h_1 - h_0$

Figure 5B:
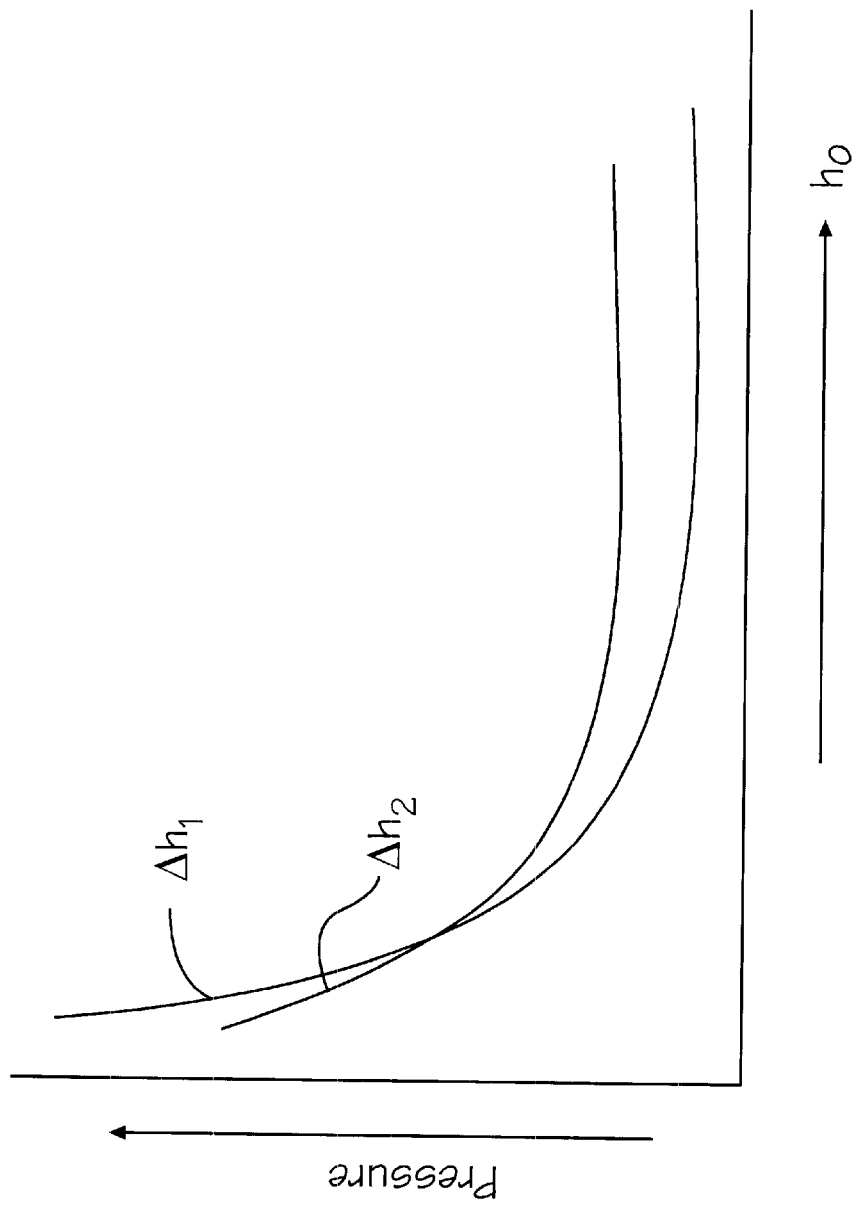
FIG. 5b is a typical plot of the relationship obtained for the wedge model, for displays of two different wedge configurations.

The solution to these equations is provided in the table of FIG. 5a. The solution is also plotted in FIG. 5b for 2 different adhesive thicknesses. This model indicates that novel lamination process of the invention can result in relatively short process times. These results have lead to the development of both rolling lamination and rolling-like (i.e., pseudo-rolling) production processes. With these novel processes, lamination rates in the range of approximately 10 inches per minute have been demonstrated to produce a bubble free result in the adhesive films.

The glass chosen for use in the preferred embodiment has a thickness of approximately the 0.5 to 1.1 mm. Glass of this thickness is easily bent to create the desired shape to form a meniscus in the interfaces between the glass and the adhesive. While a simple, uniform meniscus shape is shown schematically, it will be recognized that the shape of the meniscus may be complex depending on surface conditions of the plates, wetting of both surfaces, and the physical properties of the adhesive itself. In addition, gravitational effects will slightly alter the shape of the meniscus. The process parameters (i.e., viscosity, load, adhesive gap, surface cleanliness, wetting capability, etc.) are chosen to be in a range allowing practical manufacturing.

While AMLCD tiles have been assumed for purposes of disclosure, the inventive tool and method are equally applicable to assembling tiled, flat-panel displays using LED, OLED or POLYLED, as well as other light-emitting technology tiles.

Figure 6:
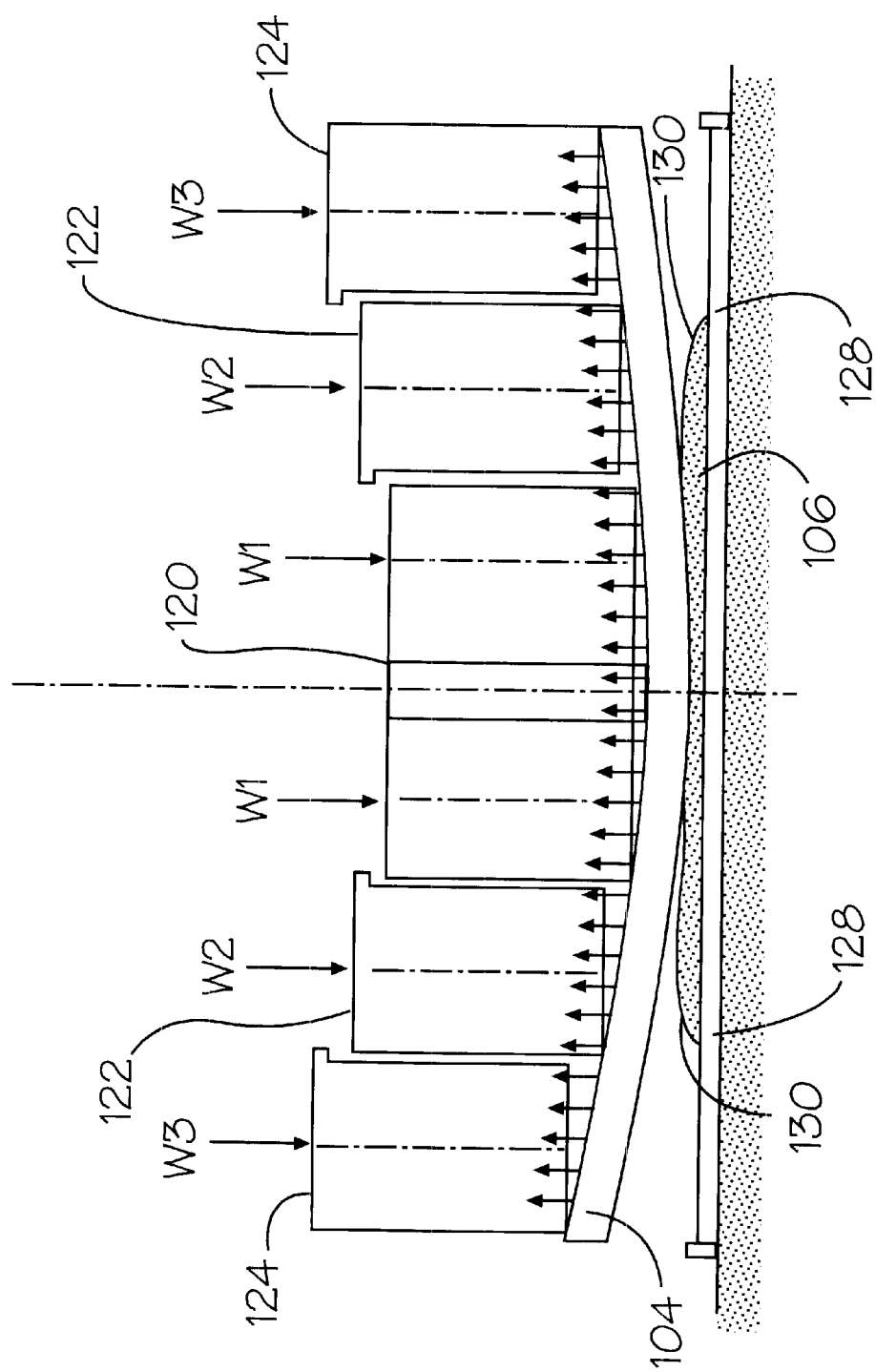
FIG. 6 is a cross sectional view of a set of concentric vacuum chucks holding a cover plate.

A tool for handling the glass plates and tiles is necessary, or at least preferable for manufacturing. A novel tool for handling these thin glass plates is shown in FIG. 6. Vacuum chucks 120, 122, 124 (FIG. 7a) are provided to pick up the cover and back plates 102, 104 for transferring them through the assembly operations. The glass cover or back plates 102, 104 may be bent to a desired curvature to simulate a roll process by using segmented concentric vacuum chucks 120, 122, 124 to hold the glass 102, 104. Retractable edge supports, shown in FIG. 3, can also be used to control the bending of glass. With this apparatus, a preferred glass radius of curvature may be obtained while still applying the necessary pressure to extrude the adhesive.

Figure 7A:
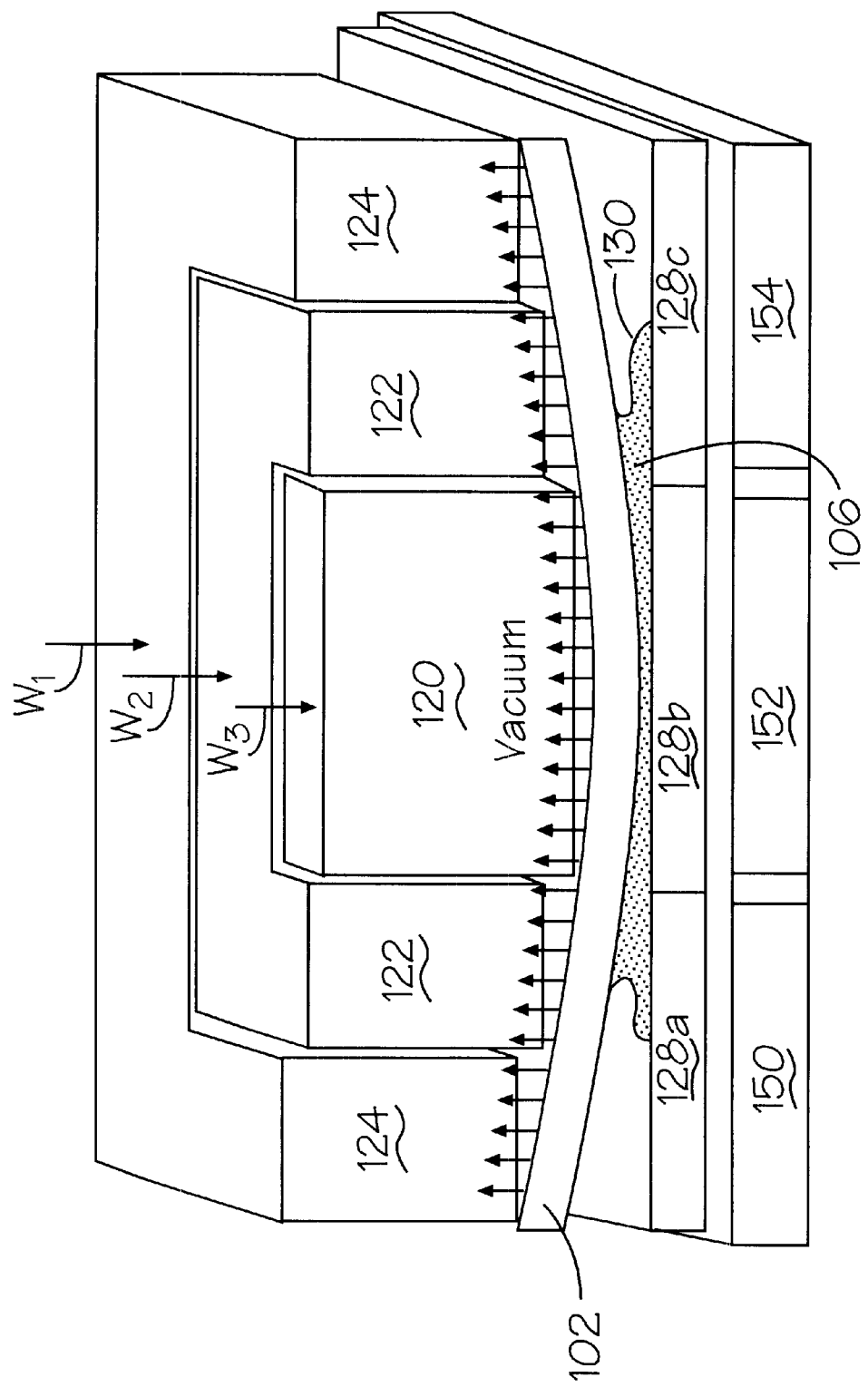
FIG. 7a is a top, three-dimensional, sectional view of the adhesive showing the perimeter of the meniscus at a later stage of the process and an elevation cross section showing the vertical position of the concentric chucks.

The adhesive is deposited in a puddle of a predetermined shape and volume to fill the gap between the cover or back plates 102, 104 and/or the tiles 128. Tiles 128 may be supported on separate vacuum chucks (not shown) which handle, support and register the tiles 128 on separate vacuum chucks 150, 152, 154 as shown in FIG. 7a. Vacuum chucks 120, 122, 124 are concentric, as best seen in FIG. 7a, Because of their concentric shape, the meniscus between the adhesive, glass plates 102, 104 and tile assemblies 128 forms a circular or elliptical perimeter which moves out over the area of the glass plates 102, 104, driven by the downward motion of the two outside vacuum chucks 122, 124.

Figure 10A:
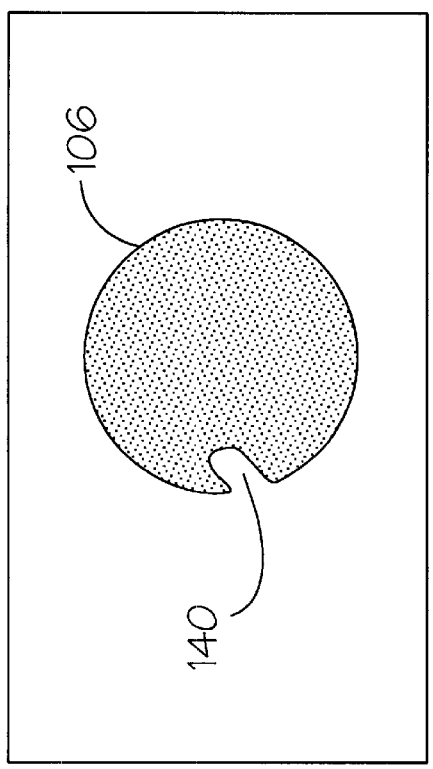
FIG. 10a is a plan view of the perimeter of the meniscus impacted by local contamination zones of the surface of either of the glass sheets.
Figure 10B:
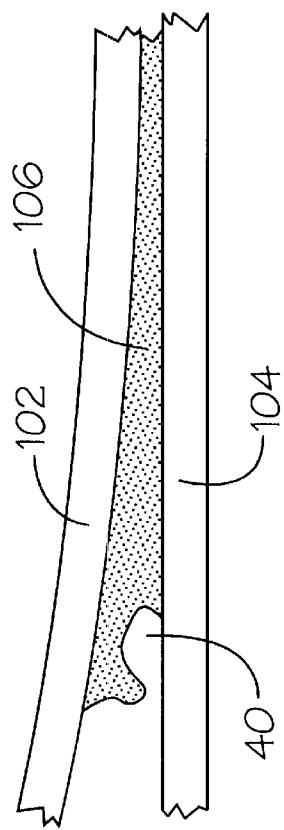
FIG. 10b is a cross sectional view of the perimeter when the speed of the meniscus exceeds the wetting capability of the glass.

This meniscus pattern is best seen in FIGS. 10a and 10b. A downward motion of all three vacuum chucks 120, 122, 124 (FIG. 7a) to contact the adhesive 106 and to establish approximately the desired adhesive gap starts the process. The air is controllably purged at the meniscus 130 of the adhesive interface during lamination by using a unique assembly machine controlled by an electronic controller (not shown). The controller, by means of a software program, controls the vacuum chucks 120, 122, 124 to bend the glass cover and back plates 102, 104 to a predetermined radius while attaching them with adhesive 106 to the tiles 128a, 128b, 128c. Concurrently, vacuum chucks 120, 122, 124 space the cover and back plates 102, 104 to the desired adhesive thickness between the plates and the tiles 128.

The glass back or cover plates 102, 104 may be a standard optical glass such as Corning, Incorporated catalog no. 1737. This type of glass is commonly used in the AMLCD industry. Standard available thicknesses are 0.5 mm, 0.7 mm and 1.1 mm. For these tiling assemblies, any of these glass thicknesses may be used. The thinner glasses allow large radii to be used in the adhesive extrusion process. A predetermined glass thickness in the aforementioned range makes a robust laminated assembly with continuity of refractive index, and well matched thermal coefficient of expansion to the glass used in the AMLCD tile assemblies 128. However, by using a very compliant adhesive (e.g., silicone), lower cost optical quality glasses with optimized strength properties may also be used for cover and back plates 102, 104.

Referring now to FIG. 7a, there is shown a perspective sectional view of three concentric vacuum chucks 120, 122, 124. It will be recognized that any number more than 2,w of concentric vacuum chucks may be used to practice the method of the invention and the inventive method is not considered limited to the particular number of vacuum chucks chosen for purposes of disclosure. Three tiles 128a, 128b, 128c are supported on three lower vacuum chucks 150, 152, 154. The use of lower vacuum chucks 150, 152, 154 is described in detail hereinbelow. A cover plate 102 is held in a curved form by concentric vacuum chucks 120, 122, 124. A layer of adhesive is placed between the surfaces of tiles 128a, 128b, 128c and cover plate 102. It will also be recognized that while a cover plate 102 is shown for purposes of disclosure, the process for attaching back plate 104 to tiles 128a, 128b, 128c is substantially the same. In the preferred embodiment, the adhesive is first applied to faces of the tile assemblies 128 is and the cover plate 102 is then laminated to the tile assemblies 128. Adhesive is next applied to the back plate 104 and the back plate 104 is laminated to the previously-laminated cover plate/tile subassembly.

Figure 7B:
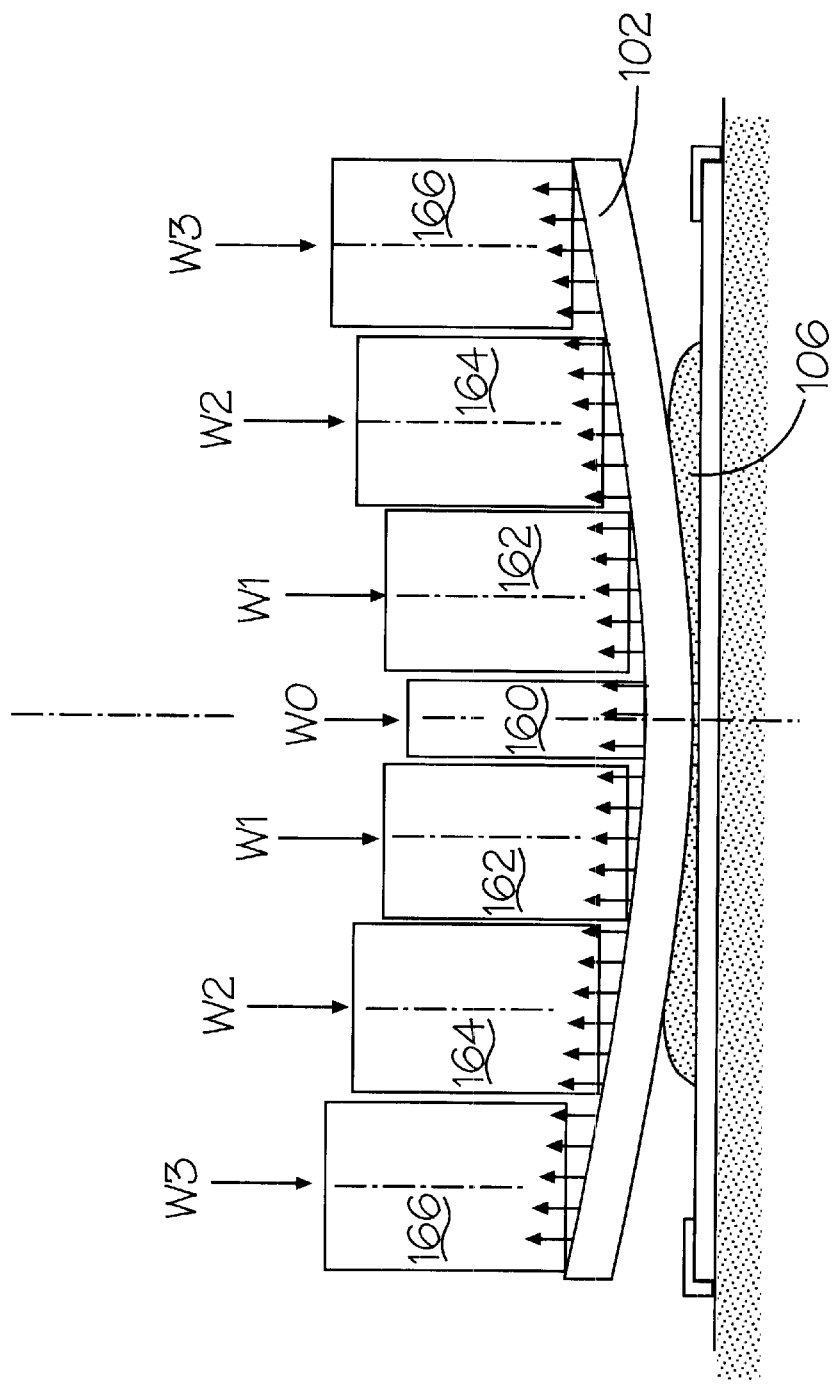
FIG. 7b is a cross sectional view showing an alternative design utilizing a set of linearly segmented vacuum chucks.

In an alternate design, a linear array of non-concentric vacuum chucks 160, 162, 164, 166 may be used as shown in FIG. 7b. The vacuum chucks 160, 162, 164, 166 are arranged in line. The curvature of the glass cover or back plates 102, 104 is controlled so as to be substantially cylindrical with this arrangement, simulating the roll configuration. This arrangement encourages more bi-directional flow of adhesive material 106 parallel to the long direction of the cover or back plates 102, 104 as the lamination proceeds with the outside chucks 162, 164, 166 progressing toward achieving the desired parallel position with the center chuck 160.

Prior art apparatuses used for forming such laminated composites have typically applied the adhesive in liquid form in a puddle over a large area. This application of adhesive is followed by a squeezing operation to meet an approximate thickness specification over the entire area. This was a slow and, consequently, expensive process, due in part to the need for highly sophisticated precision machines. Such machines, in conjunction with aligning or fiducial marks, controlled the X, Y, and Z dimensions over the large areas of the entire tiled, FPD assembly.

In the novel assembly tool of the present invention, however, tile locations and alignments are achieved automatically without any significant loss of tolerance. Any area gained by improved assembly tolerances may be used to improve (i.e., enlarge) the aperture ratio of the pixels and/or line resolution of the tiled display. Alternatively, for the same resolution and aperture ratio, a wider seal at the tile edges may be used to increase the manufacturing yield of the tiles. Both the process yield and the speed of the assembly process are significantly improved over the methods of the prior art by using the roll like technique. In addition, a shuttle system allows work on two display assemblies simultaneously.

Figure 9A:
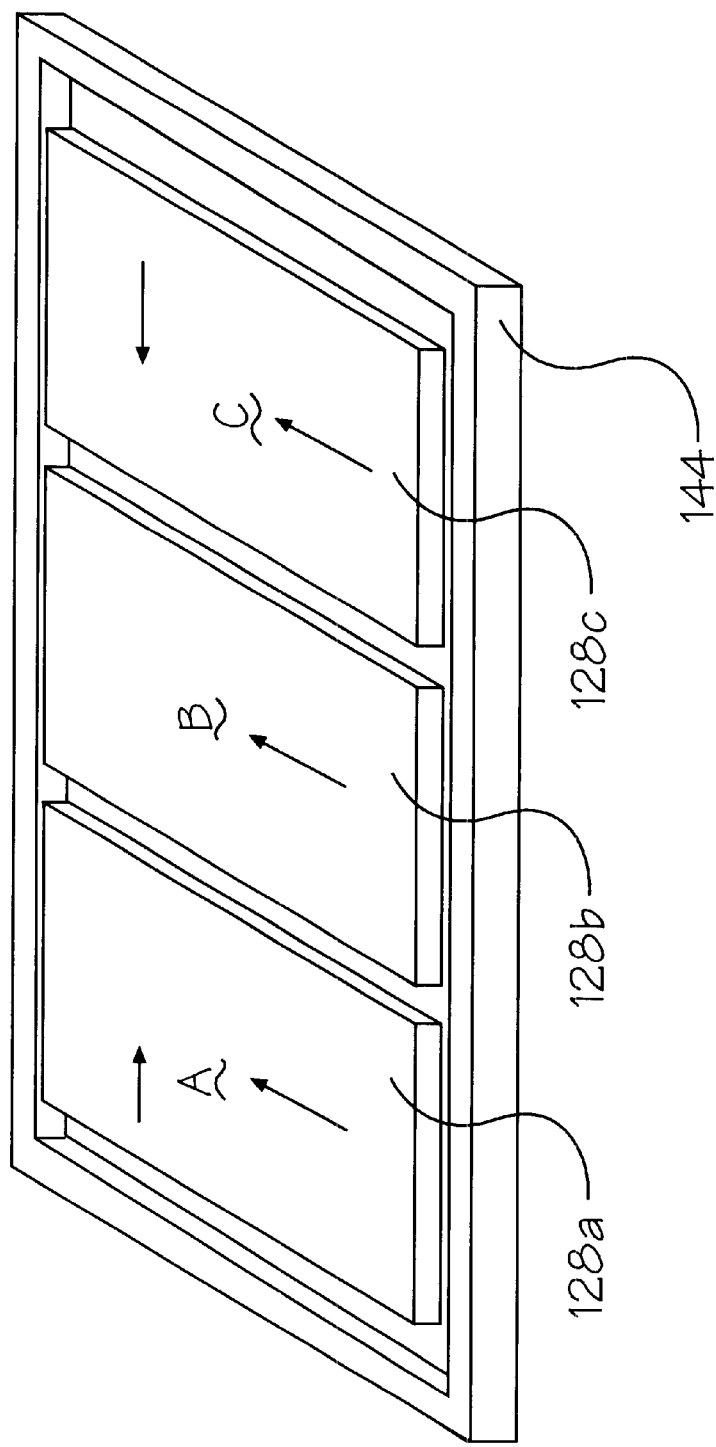
FIG. 9a is a pictorial view of the cassette holding a set of tiles approximately located and ready to be picked up by a frame containing suction cups for transferring the tiles to the tile vacuum chucks.
Figure 9B:
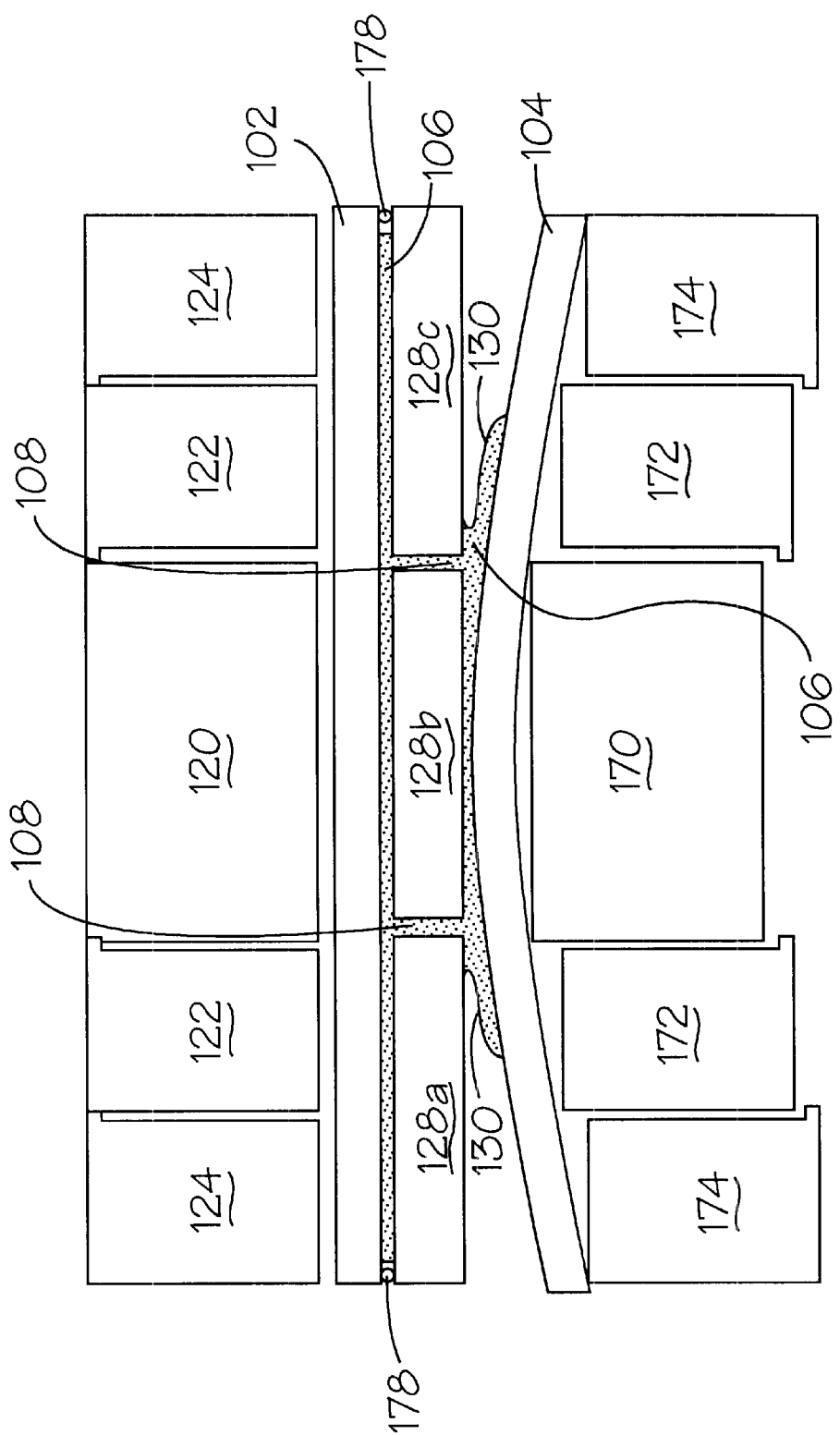
FIG. 9b is a cross sectional view showing a cover plate, previously bonded to tile assemblies, now being bonded to a back plate using lower, concentric vacuum chucks.

Referring now to FIG. 8, the concentric vacuum chucks 120, 122, 124 which hold cover or back plates 102, 104 are attached to an automatic leveling load platform 140 riding on rails 142 which are used to transfer the tiles 128 and the cover and back plates 102, 104 in a shuttle system through the sequence of process steps described hereinbelow. First the tiles 128 are placed in a cassette 144 (FIG. 9a) which is used to coarsely align the tiles 128a, 128b, 128c with respect to one another. Cassette 144 aligns the tiles 128a, 128b, 128c to within approximately 1.0 mm. Next, a set of suction cups held by a frame are shuttled into position above the cassette 144. Each tile 128a, 128b, 128c is transferred and vacuum-attached to its own independently located vacuum chuck 150, 152, 154 as shown in FIG. 7a. In this step, the tiles 128 are transferred to a dispensing position for application of adhesive. Tiles 128a, 128b, 128c are finely registered with respect to one another by movable vacuum chucks 150, 152, 154 as they are placed in the dispensing position. A UV-curable adhesive polymer (not shown) is dispensed in small dots 178 (FIG. 9b). These small adhesive dots 178 are placed around the edges of tiles 128a, 128b, 128c, taking care that these dots remain outside of the active pixel regions of the tiles 128a, 128b, 128c. These small adhesive dots, when cured, maintain the registration of tiles 128a, 128b, 128c to cover plate 102 when vacuum chucks 150, 152, 154 are removed.

Next, a heat-curable liquid polymer adhesive 106 (typically silicone) is dispensed in a predetermined pattern on the faces of all three tiles 128a, 128b, 128c. The cover plate 102 is held at a predetermined position by vacuum chucks 120, 122, 124 and is shuttled into an approximate location above the tiles 128a, 128b, 128c. Cover plate 102 is then lowered into contact with the adhesive 106. The predetermined curvature of the cover plate is controlled by the vertical positions of the three concentric vacuum chucks 120, 122, 124 holding the cover plate 102.

As the cover plate 102 is lowered into contact with the adhesive 106, a meniscus 130 is formed which moves outwardly with a circular or elliptical perimeter from the initial contact point at the middle of the glass on the center vacuum chuck 120. This meniscus pattern is best seen in FIG. 7a. The speed of movement of the liquid adhesive front (meniscus) 130 moving outward is controlled by the downward rate of motion of the concentric chucks 120, 122, 124. Once a preferred, predetermined gap is neared between the cover plate 102 and the center of the center tile 128b by manipulation of vacuum chuck 120, the downward motion of the next outer vacuum chuck 122 commences. When the portion of cover plate 102 under this vacuum chuck 124 nears the predetermined gap with tiles 128a, 128b, 128c, the downward motion of the outer vacuum chuck 124 commences. A continuous outward motion of the meniscus 130 is controlled by the downward motion of the three chucks 120, 122, 124 working in concert, each chuck stopping at a final gap, when the three chuck surfaces are substantially coplanar. At this time, the cover plate glass 102 is substantially parallel to the faces of the three tiles 128a, 128b, 128c. Process sensors and actuators (not shown) between the vacuum chucks 120, 122, 124 and load platform 140 are used to continually control and move the chucks 120, 122, 124 which are, in turn, used to control and move the cover plate 102 to establish a preferred adhesive gap 106 between cover plate 102 and the faces of tiles 128a, 128b, 128c. In addition, at the end of the lamination process, cover plate 102 is parallel to the tiles 128a, 128b, 128c. Any excess adhesive 106 over that needed to fill the gap between cover plate 102 and the tiles 128a, 128b, 128c to the preferred dimensions, is forced (i.e., squeezed) to the outside edges of the tiles 128a, 128b, 128c. Some of the excess adhesive 106 may extrude through the seam space 108 (FIG. 9b) between the tiles 128a, 128b, 128c. A gutter system (not shown) catches this excess adhesive 106 for later disposal. The adhesive 106 that is squeezed between the seams is spread by a squeegee.

The tiles 128a, 128b, 128c are next precisely located within a preferred tolerance with respect to each other and to the fiducial marks (not shown) on the tiles 128a, 128b, 128c and the cover plate 102. This is accomplished in a sequence of locating the center tile 128b to the cover plate 102 and then locating the two outer tiles 128a, 128c with respect to the center tile 128b and the cover plate 102 using vacuum chucks 150, 152, 154. When the tiles 128a, 128b, 128c are in their proper locations, intense UV light is used to cure the small polymer support dots (FIG. 9b) previously positioned around the edges of each tile 128a, 128b, 128c. These supporting polymer dots 178 are strong enough to secure the tiles 128a, 128b, 128c to the cover plate 102 when the cover plate 102 is lifted up and positioned for the attachment of the back plate 104 on its set of vacuum chucks 170, 172, 174 (FIG. 9b). One range of formulations that has been selected for strength properties is an acrylate formulation having principal components of approximately:

|  | weight % |
| --- | --- |
| Hydrocarbon ester of acrylic acid | >20 |
| Alkoxy silane | <5 |
| Polyester acrylate oligomer | 10–15 |
| Polyester urethane acrylic oiligomer | 15–20 |

The adhesive dots are not cured with UV light until after the adhesive material 106 is laminated between the tiles 128a, 128b, 128c and the cover plate 102 with the adhesive-filled gap. Therefore, the dots must be robust enough in strength, diameter and tack strength to allow the adhesive 106 to flow past them without eroding or otherwise disturbing them.

Photo-induced curing of the acrylate dots is accomplished by exposure to ultraviolet or infrared light.

The back plate 104 is then properly located with respect to the cover plate 102 now affixed to tile assemblies 128a, 128b, 128c. A predetermined pattern of liquid adhesive 106 is dispensed onto back plate 104. Then the cover plate/tile assembly, supported by the UV cured polymer dots, are shuttled into position over the back plate 104. The back plate 104, who's curvature is determined by the vertical position of three concentric lower vacuum chucks 170, 172, 174, is lifted until there is contact with adhesive 106. Back plate 104 is then pressed upward until the preferred adhesive gap (i.e., spacing between tiles 128a, 128b, 128c and back plate 104 is achieved. Lower concentric vacuum chucks 170, 172, 174 are substantially identical to concentric vacuum chucks 120, 122, 124 in both form and function. The lamination process proceeds in a similar manner to that discussed hereinabove for laminating the cover plate 102 to the faces of tiles 128a, 128b, 128c. Finally, excess adhesive 106 is cleaned from the edges of the assembly prior to oven curing. Curing is typically performed at a temperature in the range of 75"15 degrees Centigrade.

The hydrodynamic modeling described hereinabove has lead to the design of the inventive assembly machine as discussed hereinabove. This machine allows lamination process rates to increase, limited only by the mechanical and rheological conditions of the press and adhesive materials. These rates have been shown to be in the range of a few minutes per unit for FPDs as large as 40 inches diagonal. However, it may be necessary to slow lamination speed. This can prevent the formation of bubble defects which are caused when the meniscus 130 is forced, by the squeezing action, to move more rapidly than the rate at which the surfaces are wetted by the adhesive.

In other words, the speed of the lamination process must be tuned to the material properties of the liquid adhesive and its wetting rate to the glass. Certain preferred adhesives and wetting agents promote fast rates for producing bubble free structures.

The wetting ability of the glass surfaces (i.e., the surfaces of tiles 128, cover plate 102 and back plate 104), which is related to the surface tension or surface energy, may be discussed in terms of wetting angles.

If the surface energy of the glass-polymer interface is sufficiently less than the surface energy of both the glass and the polymer, there is a low probability of a bubble forming, unless it is trapped. The tendency to form a bubble is, in fact, a function of the angle that a drop of polymer makes with the glass surface. The smaller the angle of contact, the less tendency there is to form a bubble. Unfortunately, glass surfaces are readily contaminated with impurities in the air which can change the surface energy of the glass. These contaminated areas on the glass surface may cause a waviness in the meniscus which may fold back on itself and trap a bubble. This tendency increases with the rate of travel of the meniscus (i.e., the lamination speed). Therefore, a preferred glass surface is one which is uniform in surface energy and at the same time is easily wetted.

Any form of contamination may become the nucleus and initiate formation of a bubble. Ideally, the glass surface should be clean and pre-wetted or covered with a layer of compatible polymer that is easily wetted by the liquid adhesive. By definition, the compatibility factors are optical (matched index of refraction) and mechanical (having adhesive strength after curing, surface energy or low wetting angles with glass).

Generally, the adhesive agent will have low viscosity (1500 to 4500 cp), chosen so that a very thin layer may be applied by squeegee, by dipping or by other techniques known to those skilled in the art. The hardness of the adhesive after curing shall preferably be in the range of between approximately 10 and 100 Shore units to minimize any residual stresses and impact on the cell gap of the AMLCD display. A variety of polymer materials is available, having properties in the desired range. Silicones have been chosen as a preferred material for this application. However, alternative polymers such as acrylics, may also be used.

Referring now to FIG. 10a, there is shown the meniscus of an adhesive front 106 spreading outwardly as the lamination process proceeds. An area of contaminant material 140 is shown being surrounded by adhesive front 106. In flowing around area 140, adhesive front 106 may totally encircle the contaminated area 140, trapping air and forming a bubble in the adhesive.

Figure 11:
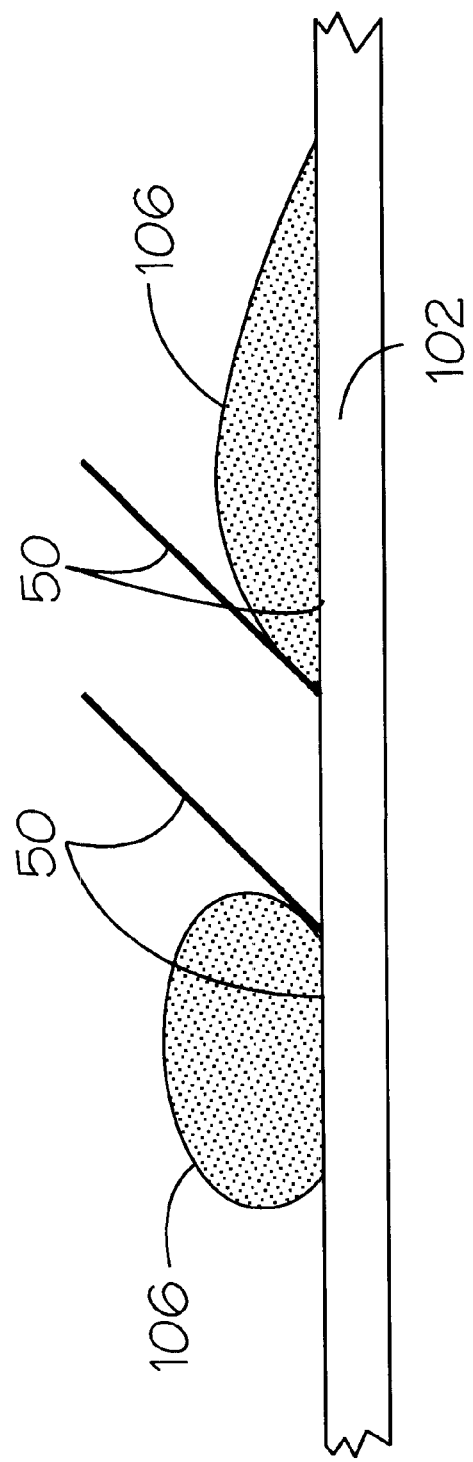
FIG. 11 shows the shape of a drop of polymer with a very good wetting capability and one with very poor wetting capability.

FIG. 10b shows how unequal wetting of the top and bottom plates 102, 104 during lamination can cause the upper front of the meniscus to trap an air bubble 40. As lamination speeds are raised, the probability of this air-trapping phenomenon increases. The phenomenon, however, has been analytically modeled so that the process may be optimized, while limiting this kind of air bubble formation. FIG. 11 shows the relationship between adhesive surface tension and surface wettability and the resulting angle of attachment 50 of the meniscus of adhesive 106.

Typically, the lamination process as described hereinabove produces few, if any bubbles in the adhesive. Any bubbles produced in the adhesive by a marginal process parameter may produce a visible defect in the finished display. It has been found that the addition of pressure to the laminated tile/cover plate assembly, particularly during the early stage of the thermal curing process accomplishes two purposes. First, the pressure keeps bubbles from forming in the adhesive as gas released during the cure is diffused back into the flowable adhesive. Second, bubbles already formed in the adhesive during lamination are eliminated. It is important that the pressure occur during the early stage of the cure process while the viscosity of the adhesive is still relatively high, since the mobility of the gas in the adhesive at that time is still high. As temperature rises in the adhesive during the cure, the adhesive viscosity decreases rapidly. A pressure of approximately 5 psi has been found effective to both eliminate existing bubble and prevent formation of new bubbles during the curing process. The pressure may be applied to the completed tile/cover plate assemblies by curing them within a pressure vessel having a pressure about 5 psi above atmosphere. It will be recognized that many methods may be used to exert pressure on the tile/cover plate assemblies during curing. These methods include weight and pressure-producing fixtures. The method by which the pressure is exerted forms no part of the instant invention.

The polymer film materials and their respective adhesive surfaces are shown. These are significant to the performance of the display, contributing in several ways to the optical response thereof. First, the index of diffraction of film materials in combination with adhesive surfaces and glass is preferably well matched (less than 10% difference) to that of the glass of the tiles 128 and to that of the cover plate 102 and back plate 104, thereby minimizing the reflections and maintaining the highest practical efficiency of light transmission for a given angular distribution of incident light.

Second, the elastic modulus of the polymer is preferably very low, less than 10,000 psi, thereby contributing minimal stress on the tiles 128 and also distributing stresses so that no discontinuities or significant gradients in cell gap occur. Such cell gap variations cause color shift at their immediate location. These variations may be visible and may be considered defects by a viewer.

Third, the seam area of the tiles 128 is particularly sensitive to showing optical artifacts, due to discontinuities in height between neighboring narrow seal edges. Therefore, the polymer adhesive material and the process, which depend on the flow properties of the adhesive, are designed to compensate for height differences in the tiles. Thus, a smooth transition is achieved, optically, from tile to tile. Preferably, the thickness of the polymer films is uniform and in the range of 100"50 microns. However, design modifications may be made so that much thicker adhesive films can be accommodated.

Fourth, the flow properties and wetting properties of the adhesive surface layer are optimized for eliminating air from the interface, making the interface bubble-free on completion of the lamination process.

While three sets of vacuum chucks have been provided in the embodiment chosen for purposes of disclosure, an additional, fourth set of vacuum chucks (not shown) could be added. This additional set of vacuum chucks allows for several enhancements to be made to the tool. First, the additional set of vacuum chucks could be used to ferry the laminated tile/cover plate assembly to a second lamination station thereby allowing the assembly tool throughput to be increased (i.e., two display assembles could built substantially simultaneously). In yet another embodiment using a fourth set of vacuum chucks, the laminated tile/cover plate could be flipped over and the same set of vacuums chucks used for the cover plates used to laminate the back plate to the tile/cover plate assembly. This would potentially allow simplification of the assembly tool.

Since other modifications and changes varied to fit particular operating requirements and environments will be apparent to those skilled in the art, the invention is not considered limited to the examples chosen for purposes of disclosure, and covers all changes and modifications which do not constitute departures from the true spirit and scope of this invention.

Having thus described the invention, what will be protected by Letters Patent is presented in the subsequently appended claims.

What is claimed is:

1. A method for assembling a tiled, flat-panel display, while maintaining tolerances in three dimensions, the steps comprising:

a) providing at least two display tiles, each having: a front face and a back face;

b) providing a first set of vacuum chucks, having respective faces substantially coplanar with one another, each one of said first set of vacuum chucks being adjustable in three degrees of freedom;

c) holding said at least two display tiles on said faces of said first set of vacuum chucks;

d) providing a second set of vacuum chucks, each of said second set of vacuum chucks having a face, and being independently adjustable in at least an axis normal to said faces of said first set of vacuum chucks;

e) holding a cover plate on said faces of said second set of vacuum chucks;

f) laminating said cover plate to said front faces of said at least two display tiles using an optical adhesive, forming a tile/cover plate assembly;

g) aligning each of said at least two display tiles to said cover plate;

h) providing a third set of vacuum chucks, each of said third set of vacuum chucks having a face, and being independently adjustable in at least an axis normal to said faces of said first set of vacuum chucks;

i) holding a back plate of said faces of said third set of vacuum chucks;

j) laminating said back plate to back faces of said at least two displays tiles of said tile/cover plate assembly using an optical adhesive;

k) arranging said tile/cover plate assembly with respect to said back plate.

2. The method for assembling a tiled, flat-panel display, while maintaining tolerances in three dimensions, as recited in claim 1, wherein at least one of said second set of vacuum chucks and said third set of vacuum chucks comprises at least one of the group: sets of concentric vacuum chucks and sets of linear vacuum chucks.

3. The method for assembling a tiled, flat-panel display, while maintaining tolerances in three dimensions, as recited in claim 2, wherein said cover plate laminating step (f) comprises the sub-steps of:
   fi) while supporting said cover plate on said second set of vacuum chuck, selectively moving at least one of said second set of vacuum chucks to form a predetermined pattern of curvature in said cover plate; and
   fii) selectively moving at least one of said second set of vacuum chucks so as to simulate a rolling movement upon said optical adhesive between said front faces of said at least two display tiles and said cover plate.

4. The method for assembling a tiled, flat-panel display, while maintaining tolerances in three dimensions, as recited in claim 3, wherein said back plate aligning and laminating step (j) comprises the sub-steps of:
   ji) while holding said back plate on said third set of vacuum chuck, selectively moving at least one of said third set of vacuum chucks to form a predetermined pattern of curvature in said back plate; and
   jii) selectively moving at least one of said third set of vacuum chucks so as to simulate a rolling movement upon said optical adhesive between said tile/cover plate assembly and said back plate.

5. The method for assembling a tiled, flat-panel display, while maintaining tolerances in three dimensions, as recited in claim 4, wherein at least one of said cover plate, said at least two display tiles, and said back plate comprise fiducial marks adapted to facilitate aligning said at least two display tiles with respect to at least one of said cover plate and said back plate.

6. The method for assembling a tiled, flat-panel display, while maintaining tolerances in three dimensions, as recited in claim 5, wherein aligning of said at least two display tiles with respect to at least one of said cover plate and said back plate is performed automatically using said fiducial marks.

7. The method for assembling a tiled, flat-panel display, while maintaining tolerances in three dimensions, as recited in claim 5, wherein said adhesive comprises at least one of the group: a flowable, thermally curable adhesive, and adhesive film.

8. The method for assembling a tiled, flat-panel display, while maintaining tolerances in three dimensions, as recited in claim 7, wherein said flowable, thermally curable adhesive is a two-part adhesive and said method for assembling a tiled, flat-panel display further comprises the steps:
   l) mixing said two-part adhesive to form a mixed adhesive;
   m) degassing said mixed adhesive prior to said laminating steps (f) and (j); and
   n) dispensing said adhesive on at least one of said at least two display tiles, said cover plate and said back plate.

9. The method for assembling a tiled, flat-panel display, while maintaining tolerances in three dimensions, as recited in claim 8, wherein said flowable, thermally curable adhesive comprises an adhesive which, when cured with a curing agent, becomes a substantially gasless and bubble-free film of a predetermined thickness.

10. The method for assembling a tiled, flat-panel display, while maintaining tolerances in three dimensions, as recited in claim 9, wherein said laminating steps (f) and (j) comprises curing said optical adhesive for a and wherein pressure is applied to a laminated assembly of said tiles, said cover plate and said backplate during for at least a portion of the time during which said curing is performed.

11. The method for assembling a tiled, flat-panel display, while maintaining tolerances in three dimensions, as recited in claim 10, wherein said pressure is applied to a laminated assembly of said tiles, said cover plate and said backplate is in the range of approximately 5 psi.

12. The method for assembling a tiled, flat-panel display, while maintaining tolerances in three dimensions, as recited in claim 8, wherein said at least two display tiles comprise means for forming electrical connections disposed upon at least one edge thereof, and wherein said lamination steps (f) and (j) further comprise the sub-steps:
   fiv) protecting said means for forming electrical connections from said adhesive proximate said at least one edge of said at least two display tiles; and
   fv) guttering and collecting excess amounts of said adhesive.

13. The method for assembling a tiled, flat-panel display, while maintaining tolerances in three dimensions, as recited in claim 12, wherein said lamination steps (f) and (j) further comprise the sub-step:
   fvi) dispensing said adhesive using a process with at least one of the characteristics: in predetermined pattern, at a predetermined rate, and in a predetermined volume.

14. The method for assembling a tiled, flat-panel display, while maintaining tolerances in three dimensions, as recited in claim 13, wherein said cover plate comprises at least one of the optical components: mask, polarizer, screen, and other optical film.

15. The method for assembling a tiled, flat-panel display, while maintaining tolerances in three dimensions, as recited in claim 13, wherein said back plate comprises at least one of the optical components: mask, polarizer, and other optical film.

16. The method for assembling a tiled, flat-panel display, while maintaining tolerances in three dimensions, as recited in claim 13, wherein at least one of said cover plate, said at least two display tiles, and said back plate comprise an optical polymer film to enhance wetting by said adhesive so as to reduce bubble formation during said lamination steps (f) and (j).

17. The method for assembling a tiled, flat-panel display, while maintaining tolerances in three dimensions, as recited in claim 16, wherein said automatic alignment of said at least two display tiles comprises the steps:
   o) placing said at least two display tiles in a fixture, said tile have a predetermined orientation;
   p) viewing at least one of said fiducial marks using a machine vision system adapted to provide a control signal responsive to said at least one of said fiducial marks; and
   q) selectively moving chucks of at least one of said first set of vacuum chucks and said second set of vacuum chucks in response to said control signal.

18. The method for assembling a tiled, flat-panel display, while maintaining tolerances in three dimensions, as recited in claim 17, wherein at least one of said lamination steps (f) and (j) comprises the sub-steps:
   fvi) dispensing UV-curable adhesive on a face of at least one of said at least two display tiles, said cover plate and said back plate proximate a respective edge thereof; and fvii) applying UV energy to cure said UV-curable adhesive.

19. The method for assembling a tiled, flat-panel display, while maintaining tolerances in three dimensions, as recited in claim 18, wherein said UV-curable adhesive is dispensed as a series of adhesive dots.

20. The method for assembling a tiled, flat-panel display, while maintaining tolerances in three dimensions, as recited in claim 2, the steps further comprising:
   l) using a fourth set of vacuum chucks to flip said tile/cover plate assembly; and
   m) using said second set of vacuum chucks to laminate both said cover plate and said back plate to said tiles.

21. The method for assembling a tiled, flat-panel display, while maintaining tolerances in three dimensions, as recited in claim 2, wherein said second set of vacuum chucks and said third set of vacuum chucks are spaced apart in a horizontal plane and define a first laminating station and a second laminating station, respectively.

22. The method for assembling a tiled, flat-panel display, while maintaining tolerances in three dimensions, as recited in claim 21, the steps further comprising:
   l) after said laminating step (f), using a fourth set of vacuum chucks to transport said tile/cover plate assembly from said first laminating station to said second lamination station; and
   m) performing said lamination step (j) at said second laminating station;
whereby two tiled, flat-panel display assemblies may be assembled concurrently.

* * * * *